United States Patent
He et al.

(10) Patent No.: US 10,764,775 B2
(45) Date of Patent: Sep. 1, 2020

(54) TECHNIQUES FOR BUFFER STATUS REPORT AND SCHEDULING REQUEST IN NEW RADIO

(71) Applicant: QUALCOMM Incorporated, San Diego, CA (US)

(72) Inventors: Linhai He, San Diego, CA (US); Aleksandar Damnjanovic, Del Mar, CA (US); Gavin Bernard Horn, La Jolla, CA (US); Aziz Gholmieh, Del Mar, CA (US); Yue Yang, San Diego, CA (US); Tao Luo, San Diego, CA (US); Sumeeth Nagaraja, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 134 days.

(21) Appl. No.: 15/923,669

(22) Filed: Mar. 16, 2018

(65) Prior Publication Data

US 2018/0279150 A1    Sep. 27, 2018

Related U.S. Application Data

(60) Provisional application No. 62/476,612, filed on Mar. 24, 2017, provisional application No. 62/476,386, filed on Mar. 24, 2017.

(51) Int. Cl.
*H04W 24/10* (2009.01)
*H04W 72/12* (2009.01)
*H04W 84/04* (2009.01)

(52) U.S. Cl.
CPC ....... *H04W 24/10* (2013.01); *H04W 72/1284* (2013.01); *H04W 72/1289* (2013.01); *H04W 72/1242* (2013.01); *H04W 84/042* (2013.01)

(58) Field of Classification Search
CPC ............ H04W 24/10; H04W 72/1242; H04W 72/1284; H04W 72/1289; H04W 84/042
See application file for complete search history.

(56) References Cited

U.S. PATENT DOCUMENTS

2018/0270698 A1* 9/2018 Babaei ............... H04W 72/042
2018/0270700 A1* 9/2018 Babaei ............. H04W 28/0278
(Continued)

FOREIGN PATENT DOCUMENTS

WO    WO-2014/183664 A1    11/2014

OTHER PUBLICATIONS

ERICSSON: "Uplink Dynamic Scheduling in NR", 3GPP Draft; R2-1700838—Uplink Dynamic Scheduling in NR, 3rd Generation Partnership Project (3GPP), Mobile Competence Centre; 650, Route Des Lucioles; F-06921 Sophia-Antipolis Cedex; France, vol. RAN WG2, No. Athens, Greece; 20170213-20170217, Feb. 12, 2017 (Feb. 12, 2017), 5 pages, XP051211619, Retrieved from the Internet: URL: http://www.3gpp.org/ftp/Meetings_3GPP_SYNC/RAN2/Docs/ [retrieved on Feb. 12, 2017].
(Continued)

*Primary Examiner* — Kashif Siddiqui
(74) *Attorney, Agent, or Firm* — Arent Fox LLP

(57) ABSTRACT

Various techniques are proposed to enhance or expand the capabilities or usage of buffer status request (BSR) and scheduling request (SR) in new radio (NR) applications. In an implementation, techniques are proposed to extend the SR in long term evolution (LTE) baseline with additional information to help a base station (e.g., gNB) schedule faster and more efficiently. Moreover, a new BSR triggering condition is proposed to report new data based on particular events instead of being time-based. Modifications being proposed to both BSR and SR can be customized for different numerologies/transmission time intervals (TTIs).

(Continued)

Modifications being proposed to SR can also be used to indicate a user equipment (UE) new beam selection after recovering from a beam failure.

26 Claims, 8 Drawing Sheets

(56) References Cited

U.S. PATENT DOCUMENTS

2018/0279353 A1* 9/2018 Shaheen ........... H04W 72/1284
2019/0021109 A1* 1/2019 Yi ........................ H04W 76/30

OTHER PUBLICATIONS

Huawei, et al., "UL Scheduling Enhancement in NR", 3GPP Draft; R2-1701207, 3rd Generation Partnership Project (3GPP), Mobile Competence Centre; 650, Route Des Lucioles; F-06921 Sophia-Antipolis Cedex; France, vol. RAN WG2, No. Athens, Greece; 20170213-20170217, Feb. 12, 2017, XP051211896, 3 Pages, Retrieved from the Internet: URL: http://www.3gpp.org/ftp/Meetings_3GPP_SYNC/RAN2/Docs/ [retrieved on Feb. 12, 2017].
International Search Report and Written Opinion—PCT/US2018/023110—ISA/EPO—dated Jul. 10, 2018 17 pages.
LG Electronics Inc: "BSR Enhancement for New RAT", 3GPP Draft; R2-1701535 BSR Enhancement for NR, 3rd Generation Partnership Project (3GPP), Mobile Competence Centre; 650, Route Des Lucioles; F-06921 Sophia-Antipolis Cedex; France, vol. RAN WG2, No. Athens, Greece; 20170213-20170217, Feb. 12, 2017 (Feb. 12, 2017), pp. 1-2, XP051212159, Retrieved from the Internet: URL: http://www.3gpp.org/ftp/Meetings_3GPP_SYNC/RAN2/Docs/ [retrieved on Feb. 12, 2017].

\* cited by examiner

180

| UE's total buffer size |
|---|

Length        6 bits

| R | R | E | LCH ID = BSR CE | Oct 1 |
| # of reported LCHs | | | LCH ID #1 | Oct 2 |
| LCH ID #1 | buffer size #1 | | | Oct 3 |
| LCH ID #2 | | buffer size #2 | | Oct 4 |
| buffer size #2 | ... | padding | | ⋮ |

R: reserved bit

| R | R | E | LCH ID = BSR CE | Oct 1 |
| --- | --- | --- | --- | --- |
| BSR Type | | | Buffer Size Index | Oct 2 |

R: reserved bit

*FIG. 1-4*

TECHNIQUES FOR BUFFER STATUS REPORT AND SCHEDULING REQUEST IN NEW RADIO

CROSS-REFERENCE TO RELATED APPLICATION(S)

This application claims the benefit of U.S. Provisional Application Ser. No. 62/476,386, entitled "TECHNIQUES FOR BUFFER STATUS REPORT AND SCHEDULING REQUEST IN NEW RADIO" and filed on Mar. 24, 2017, and U.S. Provisional Application Ser. No. 62/476,612, entitled "TECHNIQUES FOR BUFFER STATUS REPORT AND SCHEDULING REQUEST IN NEW RADIO" and filed on Mar. 24, 2017, each of which is expressly incorporated by reference herein in its entirety.

BACKGROUND

Aspects of the present disclosure relate generally to wireless communication networks, and more particularly, to techniques for buffer status report (BSR) and scheduling request (SR) in new radio (NR).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio or NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current BSR and/or SR solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various techniques are proposed to enhance or expand the capabilities or usage of BSR and SR in NR applications. In an implementation, techniques are proposed to extend the SR in long term evolution (LTE) baseline with additional information to help a base station (e.g., gNB) schedule faster and more efficiently. Moreover, a new BSR triggering condition is proposed to report new data based on particular events instead of being time-based. Modifications being proposed to both BSR and SR can be customized for different numerologies/transmission time intervals (TTIs). Modifications being proposed to SR can also be used to indicate a user equipment (UE) new beam selection after recovering from a beam failure.

In an aspect, the present disclosure includes a method of wireless communications including generating, at a UE, a BSR for new radio wireless applications, and transmitting the BSR to a base station. The BSR can be generated and/or transmitted in accordance with the various techniques described herein.

In another aspect, the present disclosure includes a method of wireless communications including generating, at a UE, an SR for new radio wireless applications, and transmitting the SR to a base station. The SR can be generated and/or transmitted in accordance with the various techniques described herein.

In another aspect, the present disclosure includes an apparatus for wireless communications, comprising a memory storing instructions and a processor coupled to the memory and configured to execute the instructions to generate, at a UE, a BSR for new radio wireless applications, and transmit the BSR to a base station.

In another aspect, the present disclosure includes an apparatus for wireless communications, comprising a memory storing instructions and a processor coupled to the memory and configured to execute the instructions to generate, at a UE, a SR for new radio wireless applications, and transmitting the SR to a base station.

In another aspect, the present disclosure includes an apparatus for wireless communications, comprising means for generating, at a UE, a BSR for new radio wireless applications, and means for transmitting the BSR to a base station.

In another aspect, the present disclosure includes an apparatus for wireless communications, comprising means for generating, at a UE, a SR for new radio wireless applications, and means for transmitting the SR to a base station.

In another aspect, the present disclosure includes a computer-readable medium storing computer-executable code for wireless communications, comprising code for generating, at a UE, a BSR for new radio wireless applications, and code for transmitting the BSR to a base station.

In another aspect, the present disclosure includes a computer-readable medium storing computer-executable code for wireless communications, comprising code for generating, at a UE, a SR for new radio wireless applications, and code for transmitting the SR to a base station.

In another aspect, the generation and transmission of the BSR can be performed along with or in connection with the generation and transmission of the SR.

Moreover, the present disclosure also includes apparatus having components or configured to execute or means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 1-2 is a schematic diagram of a physical uplink control channel format for new radio applications;

FIG. 1-3 is a schematic diagram of a variable-size BSR format for new radio applications;

FIG. 1-4 is a schematic diagram of a short BSR format for new radio applications;

FIG. 2 is a schematic diagram of example components of the UE of FIG. 1-1;

FIG. 3 is a schematic diagram of example components of the base station of FIG. 1-1;

FIG. 4 is a flow diagram of an example of a method for BSR generation and transmission in new radio applications.

DETAILED DESCRIPTION

Figure 1:
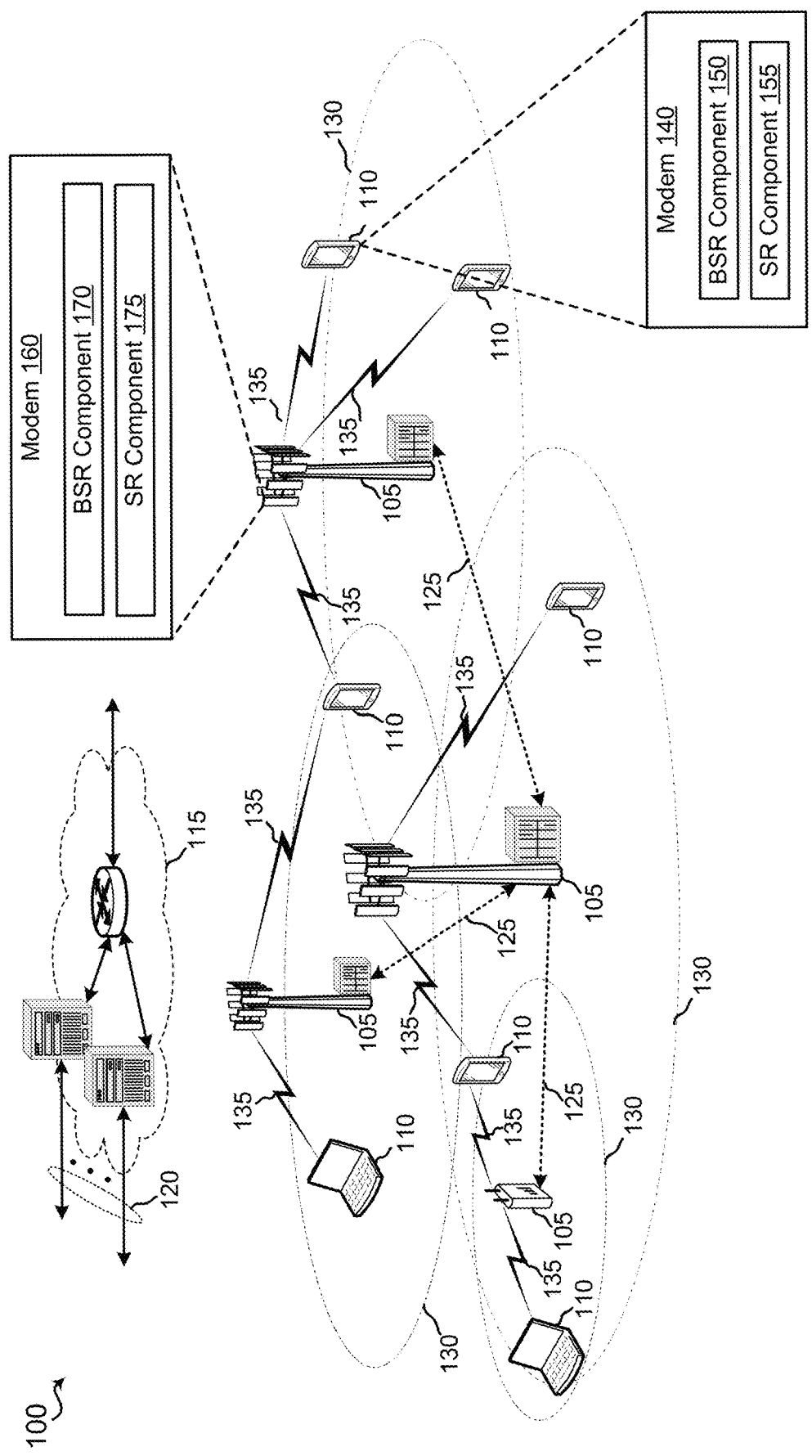
FIG. 1-1 is a schematic diagram of a wireless communication network including at least one user equipment (UE) having an SR component and/or a BSR component configured according to this disclosure to generate and transmit one or both of SR or BSR for new radio applications.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to various techniques to enhance or expand the capabilities or usage of BSR and SR in new radio applications. In an implementation, techniques are proposed to extend the SR in LTE baseline with additional information to help a base station (e.g., gNB) schedule faster and more efficiently. Moreover, a new BSR triggering condition is proposed to report new data based on particular events instead of being time-based. Modifications being proposed to both BSR and SR can be customized for different numerologies/TTIs. Modifications being proposed to SR can also be used to indicate a UE new beam selection after recovering from a beam failure.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1-1, in accordance with various aspects of the present disclosure, an example wireless communication network 100 includes at least one UE 110 with a modem 140 having a BSR component 150 that performs various techniques (e.g., functions, operations, tasks) described herein for BSR generation and transmission in new radio applications. The modem 140 also has an SR component 155 that performs various techniques (e.g., functions, operations, tasks) described herein for SR generation and transmission in new radio applications. Further, wireless communication network 100 includes at least one base station 105 with a modem 160 having a BSR component 170 that receives and processes BSRs generated and transmitted from a UE 110. The BSR component 170 can also provide configuration information used by the corresponding BSR component 150 in a UE 110. In addition, the modem 160 has an SR component 175 that receives and processes SRs generated and transmitted from a UE 110. The SR component 175 can also provide configuration information used by the corresponding SR component 155 in a UE 110. Thus, according to the present disclosure, enhanced BSR and SR techniques are provided in connection with new radio communications between UEs 110 and base stations 105.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a new radio (NR) or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Additional details related to the enhanced BSR and SR techniques described herein are provided below in connection with the wireless communication network 100 described in FIGS. 1-1 to FIG. 1-4.

In the LTE baseline, SR on physical uplink control channel (PUCCH) is a binary signaling scheme indicating whether there is pending uplink data at the UE (e.g., UE 110). Therefore, from the information provided by the SR alone, the base station (e.g., gNB, base stations 105) may only know that the UE has data waiting to be transmitted but may not know how much data there might be and what type of priority is associated with the data. As a result, the gNB may take a conservative approach by first providing a small UL grant for a BSR first and then allocating resources accordingly. This approach can lead to resources being used efficiently but has long scheduling latency. An alternative approach would be to estimate how much data there might be (e.g. based on past statistics) waiting to be transmitted at the UE and then allocate enough resources to get at least the initial portion of data. This other approach can start UL transmission quickly but might waste resources if the gNB over estimates how much data there is waiting for transmission.

To help address these tradeoffs, SR can be expanded or extended to include additional information. This additional information may enable the gNB to allocate a right amount of resources to the UE in just one round-trip time (e.g., right allocation with low latency). Since PUCCH can carry little information, the expansion of SR has to be compact and yet it has to convey enough useful information about UE's buffer status. Accordingly, it is proposed that this piece of additional information about the UE is to include the UE's total buffer size, because such information may only require six bits and yet it provides a good summary on the amount of data that UE has buffered.

In addition, the network (e.g., base station) can configure a priority threshold for UEs. In an enhanced SR message, the UE reports the total buffer size of the logical channels that have priorities higher than the priority threshold. If a UE has new data but the new data does not belong to those high-priority logical channels, the UE can then use the existing SR message to request grants from the network.

Figure 2:
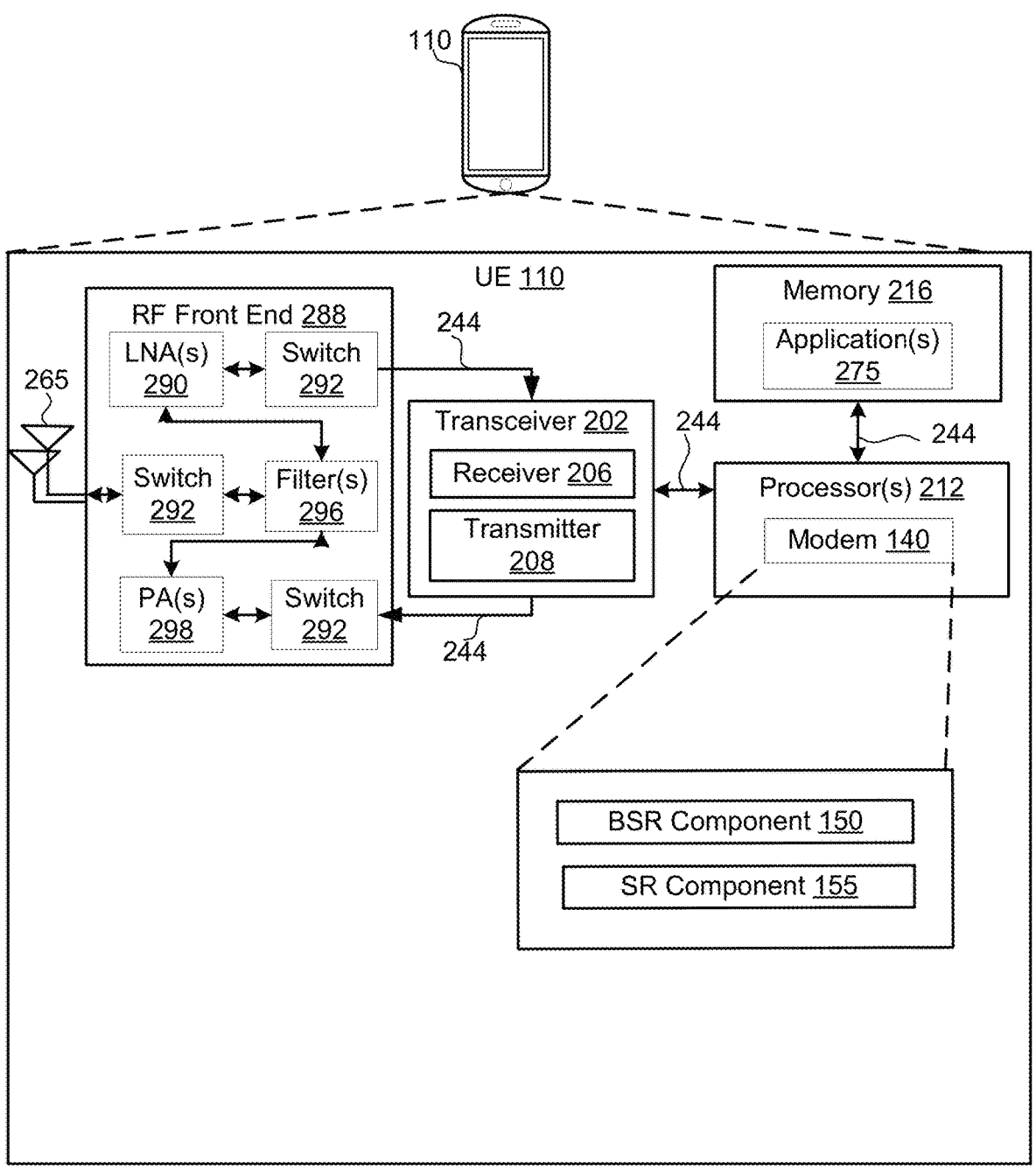

To send or transmit this enhanced SR, a new PUCCH format may be defined as shown in FIG. 1-2 and may include a field indicating a UE's total buffer size (e.g., format of an enhanced SR).

Accordingly, a proposed technique includes having a new PUCCH defined for the enhanced SR, which includes at least information about the UE's total buffer size and may include other information.

In another aspect, for the LTE baseline, a BSR reports buffer length of logical channel groups (LCG) (e.g., for each LCG identifier or ID) instead of logical channels (LCH). There is a total of four LCGs. One of the LCGs is dedicated to control channel, leaving all remaining LCHs not associated with this LCG and with varying priorities grouped into remaining three LCG's. Consequently, an LCG may contain LCHs with very different priorities. Another issue in NR is that an LCH can be mapped to multiple numerologies/TTIs. But LCHs with different mappings may be multiplexed into the same LCG. Therefore, when UEs report BSR on a per LCG basis, the gNB may not be able to get an accurate report on the buffer size of each of its priority class or each of the configured numerologies/TTIs. Because of the per LCG reporting, there is effectively only three QoS classes for data applications. This can result in sub-optimal UL resource allocation. One solution is to have the buffer status reported on per LCH basis instead. Accordingly, another proposed technique includes having the buffer status reported on a per LCH basis instead of on a per LCG basis.

Figure 3:
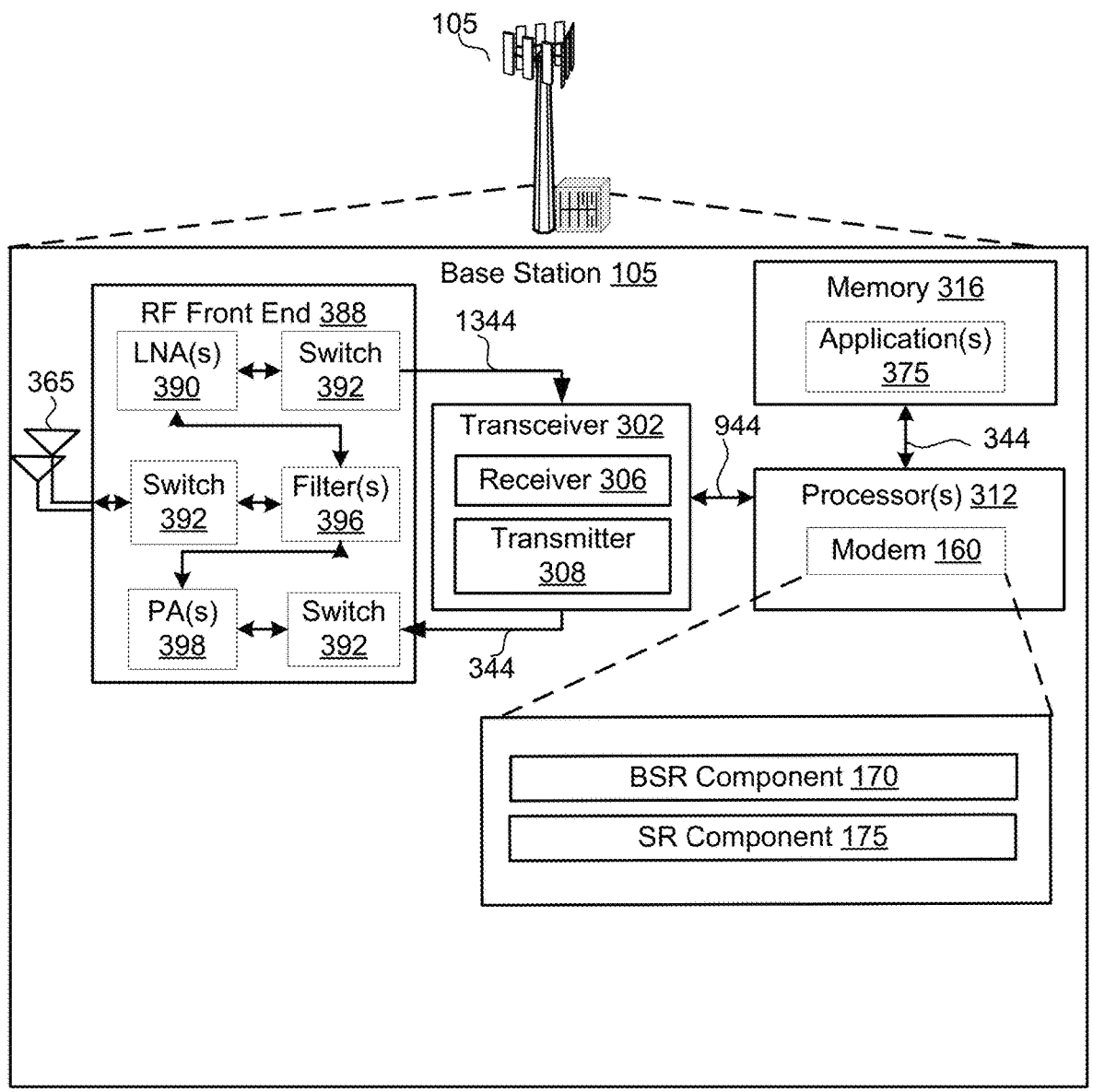

Based on this change, two formats of BSR are proposed for NR. First, a variable-size BSR 182 is shown in FIG. 1-3. A variable size BSR 182 can contain the buffer size of all or a subset of non-empty LCHs.

After the medium access control (MAC) control element (CE) header, a number of fields associated with the variable-size BSR 182 format may be included. For example, a two-bit BSR Type field may indicates which one of three types the BSR constitutes: a full-size BSR, a truncated BSR or short BSR. In some aspects, there may be different conditions when each of them is used. A number of LCHs may be included, which is five-bit long. Further, an LCH ID and a corresponding buffer size index for each LCH may be included in this BSR. The LCHs may be included by the order of their priority, i.e. the first LCH has the highest priority. Finally, padding may be included to fill the byte boundary.

Note that the variable-size BSR 182 format may be used for both truncated and full BSRs. Second, a short BSR 184 can also be used. The short BSR 184 format 184 is shown in FIG. 1-4 The short BSR 184 can be sent or transmitted as padding in a MAC packet data unit (PDU) having spare space that is more than two bytes but which may not fit the smallest truncated BSR. The short BSR 184 may contain the total buffer size of all non-empty LCHs. After the MAC CE header, at least two fields associated with the short BSR 184 format described above may be included. First, a BSR Type, which may be a two-bit field and may indicate a short BSR status/format. Second, a total buffer size of all non-empty LCHs.

Accordingly, another proposed technique includes using two formats of BSR, where these two formats as defined support full BSR, truncated BSR, and short BSR.

The short BSR 184 and the variable-size BSR 182 can be sent or transmitted as paddings in MAC PDUs when spare space is available. A number of conditions may be configured on when to send each BSR. For example, a short BSR 184 can be included in a UL MAC PDU as padding if that MAC PDU has a spare space which is at least two-bytes long but shorter than four bytes. Further, a truncated or full BSR can be included in a UL MAC PDU if the spare space is at least four-byte long. Depending on the size of the spare space available, this BSR can be either a truncated BSR (e.g., where some LCHs may not be included) or a full BSR.

Accordingly, another proposed technique may include having short BSRs and variable-size BSRs sent as padding in MAC PDUs.

Moreover, in the LTE baseline, new data (e.g., new data received for transmission) can trigger BSRs only if the data's priority is higher than the priorities in the last report. Otherwise, BSRs (except padding BSRs) are sent periodically, independent from data arrivals or UL transmissions. One challenge presented by this approach is that if new data belongs to the same LCH in the last report, it may not be reported until the next periodic BSR. If there is no subsequent new data of higher-priority that arrives to trigger a BSR, the UE could risk being underserved, because the gNB may not be aware of the new data. To avoid possible underserving, the periodic BSRs may need to have short periods. But short reporting periods can result in unnecessary reports/overhead. Therefore, a solution to this issue can be to use event-based reporting rather than the baseline periodic BSR. The event-based reporting may be more efficient and, consequently, may be used in NR applications.

With event-based reporting, a BSR may be included in a UL MAC PDU (which do not tend to trigger SRs) if there has been new data since the last BSR and one of at least two conditions is also met. One condition may include where the received UL grant is larger than a configured threshold, that is, if resource is plenty and a BSR is only a very small piece of overhead, the UE may report the new data as soon as possible. Another condition may be otherwise (when the received UL grant is not large), a UE does not need to report new data until the gNB is about to finish serving the last reported data in a LCH. A condition for determining this reporting time is whether the unserved portion of the last reported data has dropped below a configured threshold.

There may be different methods that a UE can use to determine the unserved portion of last reported data. The method selected may depend on the UE's specific implementation.

In addition, the proposed event-driven reporting scheme can be used as an addition, instead of a replacement, to the existing periodic BSRs. Periodic BSRs can still work together with the existing retx_BSRs to help avoid deadlock situations in case of SR or BSR failures. It is also proposed, however, to extend the default period of periodic BSRs, so that they are not triggered in most cases.

Accordingly, another proposed technique includes, in addition to the regular BSR, ReTx BSR, padding BSR and periodic BSR in the LTE baseline, that a UE include a BSR in a UL MAC PDU if there has been new data since the last BSR and one of the following conditions is met: the received UL grant is larger than a configured threshold; otherwise, the unserved portion of the last reported data in that LCH drops below a configured threshold. The exact method in determining the unserved portion of the last reported data can be implementation dependent.

This BSR can be either a full BSR or a truncated BSR with a fixed size configured by the network.

Another proposed technique includes having the default period of periodic BSRs extended from that in the LTE baseline so that they are not triggered in most cases.

In NR, different numerologies/TTIs are configured to support services with different quality-of-service (QoS) requirements. These different QoS requirements may require that UE to use different scheduling policies for different numerologies/TTIs. For example, the UE may use data's deadline to schedule URLLC service but may use prioritized bit rate (PBR) in the LTE baseline for enhanced mobile broadband (eMBB). Therefore, different types of scheduling policy may require a UE to classify its logical channels based on different metrics and report its buffer status according to that classification.

Accordingly, another proposed technique includes different numerologies/TTIs having their own structure, content and triggering conditions for SR and BSR, if required by their respective application requirements.

In the LTE baseline, UEs can send SRs only at configured periods, which can directly affect the scheduling latency. For this reason, for a numerology/TTI, the minimum configurable period for SR may be the same as its TTI, and the maximum configurable period may be no larger than the latency requirement of its target applications.

Accordingly, another proposed technique includes having the range of the configurable periods of SR aligned with the TTI and latency requirement of the associated applications.

In yet another aspect, padding BSR is an efficient way for UEs to use spare UL resources to report its buffer status. Therefore, if spare UL resources are available to include a BSR on a numerology/TTI that the UE is configured to use, the UE can be allowed to use the available opportunity and include a padding BSR. If more than one numerologies/TTIs can include the BSR as padding, the UE can decide which numerology/TTI to use.

Accordingly, another proposed technique includes, if a UE supports multiple numerologies/TTIs, having the UE send a padding BSR over any one of the numerologies/TTIs that it is configured to use. If more than one numerology/TTI can include a padding BSR, the UE is configured to decide which numerology/TTI to use.

In a mmW system, after a UE recovers from a beam failure, the UE may need to inform the gNB of its new beam selection. The UE may use the enhanced SR for this purpose, instead of creating a new signaling message. This may be feasible because the gNB can learn the UE's new beam from which direction the SR is received, this SR can trigger the same set of procedures at the gNB as it would in a normal operation, so there is no confusion at the gNB, and/or if the UE has no data buffered, the gNB can learn that from the truncated BSR in the SR, such that the gNB may not configure any UL grant for the UE.

Accordingly, another proposed technique includes, in a mmW system, after a UE recovers from a beam failure, the UE can send an enhanced SR to the gNB to inform the gNB of the UE's new beam selection.

The various aspects described above provide a new PUCCH can be defined for the enhanced SR, which can include a UE's total buffer size. Further, buffer status can be reported on a per-LCH basis. In some aspects, two formats of BSR can be defined to support full BSR, truncated BSR and short BSR. The short and variable-size BSRs can be sent as paddings in MAC PDUs. The conditions on when to send them are similar to those in the LTE baseline. In addition to the regular BSR, ReTx BSR, padding BSR and periodic BSR in the LTE baseline, a UE can include a BSR in a UL MAC PDU if there has been new data since the last BSR and one of the following conditions is met: the received UL grant is larger than a configured threshold, and/or otherwise, the unserved portion of the last reported data in that LCH drops below a configured threshold. The exact method in determining the unserved portion of the last reported data can be implementation dependent. This BSR can be either a full BSR or a truncated BSR with a fixed size configured by the network. The default period of periodic BSRs can be extended from that in the LTE baseline so that they are not triggered in most case. Different numerologies/TTIs may have their own structure, content and triggering conditions for SR and BSR, if required by their respective application requirements. The range of the configurable periods of SR can be aligned with its TTI and latency requirement of the associated applications. If a UE supports multiple numerologies/TTIs, a padding BSR can be sent over any one of the numerologies/TTIs that it is configured to use. If more than one numerology/TTI can include a padding BSR, it is left to UE to decide which numerology/TTI to use. In a mmW system, after a UE recovers from a beam failure, it can send an enhanced SR to the gNB to inform its new beam selection.

The various aspects described above can be implemented using the architectures described below for the UE 110 and/or the base station (e.g., gNB) 105.

Referring to FIG. 2, one example of an implementation of UE 110 may include a variety of components, some of which have already been described above, but including components such as one or more processors 212 and memory 216 and transceiver 202 in communication via one or more buses 244, which may operate in conjunction with modem 140 and BSR component 150 and SR component 155 to enable one or more of the functions described herein related to BSR and SR generation and transmission for new radio application. Further, the one or more processors 212, modem 140, memory 216, transceiver 202, RF front end 288 and one or more antennas 286, may be configured to support voice and/or data calls (simultaneously or non-simultaneously) in one or more radio access technologies.

In an aspect, the one or more processors 212 can include a modem 140 that uses one or more modem processors. The various functions related to BSR component 150 and SR component 155 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with BSR component 150 and SR component 155 may be performed by transceiver 202.

Also, memory 216 may be configured to store data used herein and/or local versions of applications 275, BSR component 150, SR component 155, and/or one or more of their subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining BSR component 150, SR component 155, and/or one or more of their subcomponents, and/or data associated therewith, when UE 110 is operating at least one processor 212 to execute BSR component 150, SR component 155, and/or one or more of its subcomponents. As described herein, a subcomponent of BSR component 150 and/or of SR component 155 may refer to a portion of the component that is configured to perform a specific function, operation, or task of the various functions, operations, or tasks supported by the component. Although such subcomponents may not be shown, it is understood based on the current disclosure that several functions, operations, or tasks associated with BSR component 150 and/or SR component 155 can be implemented in one or more subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105 (e.g., gNB). Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one base station 105 or wireless transmissions transmitted by UE 110. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 1298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 202 to operate at a specified frequency and power level based on the UE configuration of the UE 110 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Referring to FIG. 3, one example of an implementation of base station 105 may include a variety of components, some of which have already been described above, but including components such as one or more processors 312, memory 316, and transceiver 302 in communication via one or more buses 344, which may operate in conjunction with modem 160 and BSR component 170 and/or SR component 175 to enable one or more of the functions described herein related to receiving, processing, and/or configuring BSR and SR for new radio applications.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 110, as described above, but configured or otherwise programmed for base station operations as opposed to UE operations.

The various functions related to BSR component 170 and SR component 175 may be included in modem 160 and/or processors 312. Moreover, in an aspect, for example, memory 316 may be a non-transitory computer-readable storage medium that stores one or more computer-executable codes defining BSR component 170, SR component 175, and/or one or more of their subcomponents, and/or data associated therewith, when base station 105 is operating at least one processor 312 to execute BSR component 170, SR component 175, and/or one or more of its subcomponents. As described herein, a subcomponent of BSR component 170 and/or of SR component 175 may refer to a portion of the component that is configured to perform a specific function, operation, or task of the various functions, operations, or tasks supported by the component. Although such subcomponents may not be shown, it is understood based on the current disclosure that several functions, operations, or tasks associated with BSR component 170 and/or SR component 175 can be implemented in one or more subcomponents.

Figure 4:
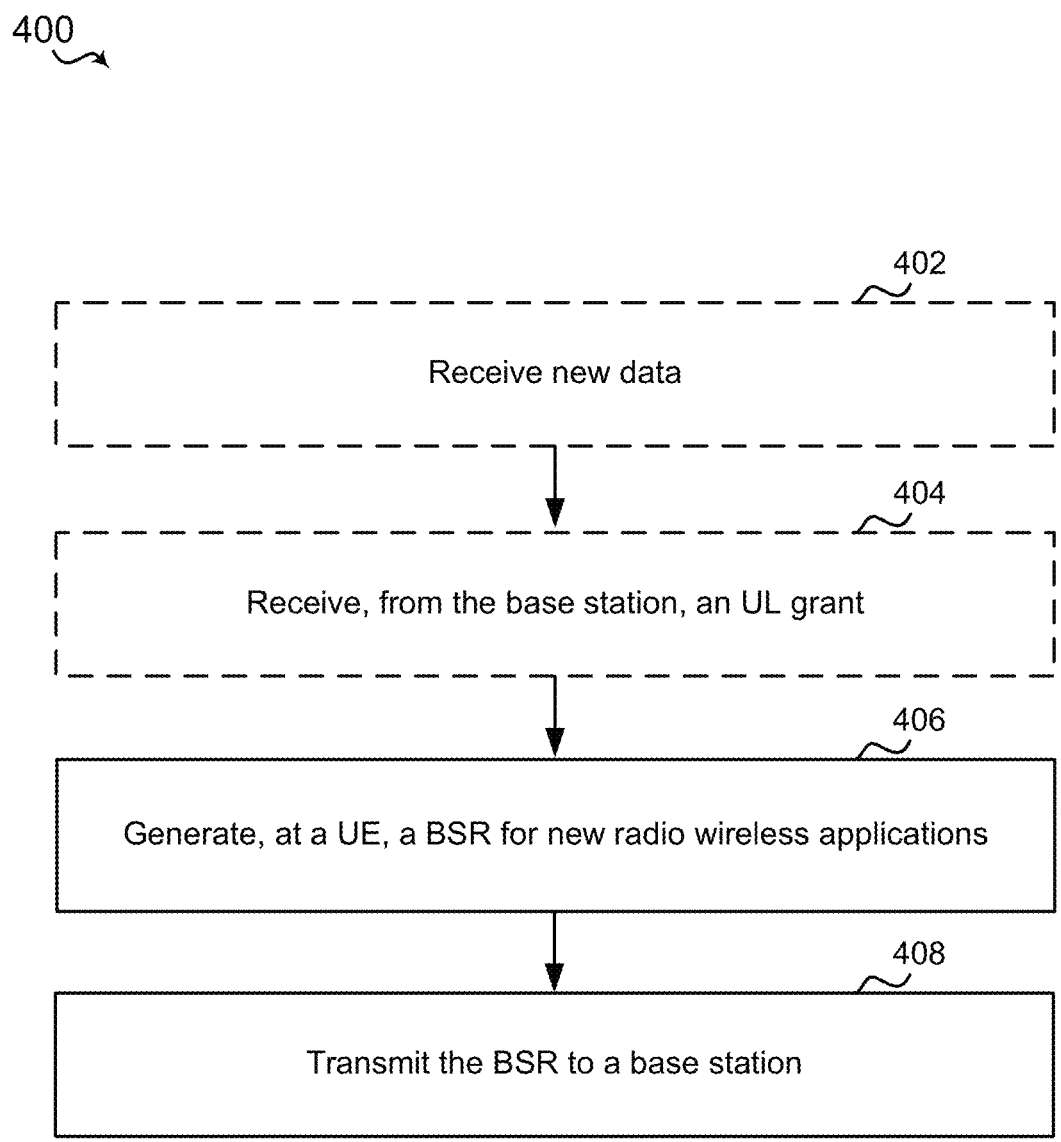

Referring to FIG. 4, for example, a method 400 of wireless communication in operating UE 110 according to the above-described aspects to provide enhanced functionality for BSR in new radio applications includes one or more of the herein-defined actions.

For example, at 402, method 400 includes receiving new data. In an aspect, UE 110 may execute processor 212, modem 140, and/or BSR component 150 to receive new data from a base station 105, gNB.

At 404, method 400 may receive, from the base station, an UL grant. For example, in an aspect, UE 110 may execute processor 212, modem 140, and/or BSR component 150 to receive, from the base station 105 (e.g., gNB), an UL grant.

In some aspects, the UL grant may be larger than a configured threshold. In some aspects, the UL grant may be smaller than a first configured threshold.

At 404, method 400 includes generating, at a UE (e.g., UE 110), a BSR for new radio wireless applications. For instance, in an aspect, UE 110 may execute processor 212, modem 140, and/or BSR component 150 to generate the BSR, as described herein.

In some aspects, the BSR may indicate at least one of a buffer size for each logical channel or a total size for a set of logical channels. In some aspects, the BSR may be a short BSR that includes information reporting a buffer size for one logical channel with non-empty buffer.

In some aspects, the BSR may be a truncated BSR that includes information reporting a buffer size for at least one of a logical channel with highest priority or a subsequent highest priority and a non-empty buffer.

In some aspects, the BSR is a truncated BSR that includes information reporting a buffer size for at least one of a set of the logical channels or a subset of the logical channels with non-empty buffers.

In some aspects, generating the BSR and transmitting the BSR may occur in response to receiving the new data and the UL grant, the BSR including information reporting a size of the new data. Further, in some aspects, the BSR may have a format structure containing information for a number of logical channels.

In some aspects, generating the BSR and transmitting the BSR may occur in response to receiving the new data and the UL grant and having an unserved portion of a last reported data in a corresponding logical channel drops below a second configured threshold, the BSR including information reporting a size of the received new data.

In some aspects, one or more of a structure, content, or triggering conditions of the BSR may be based on at least one of a configured numerology or configured TTI required by a respective application.

In some aspects, a range of configurable periods of the BSR may be aligned with at least one of a configured numerology or configured TTI and latency requirement of a respective application.

In some aspects, the UE may support multiple configured numerologies, multiple configured TTIs, or both, and the transmitting of the SR includes transmitting a padding BSR over any one or more of the configured numerologies or configured TTIs.

At 408, method 400 includes transmitting the BSR to a base station (e.g., base station 105, gNB). For instance, in an aspect, UE 110 may execute processor 212, modem 140, BSR component 150, transceiver 202, and/or RF front end 288 to transmit the BSR, as described herein.

Further, in some aspects, transmitting the BSR may include transmitting the short BSR in an UL MAC PDU if the UL MAC PDU has a spare space. In some aspects, transmitting the BSR may include transmitting the truncated BSR in an UL MAC PDU if the UL MAC PDU has a spare space.

Figure 5:
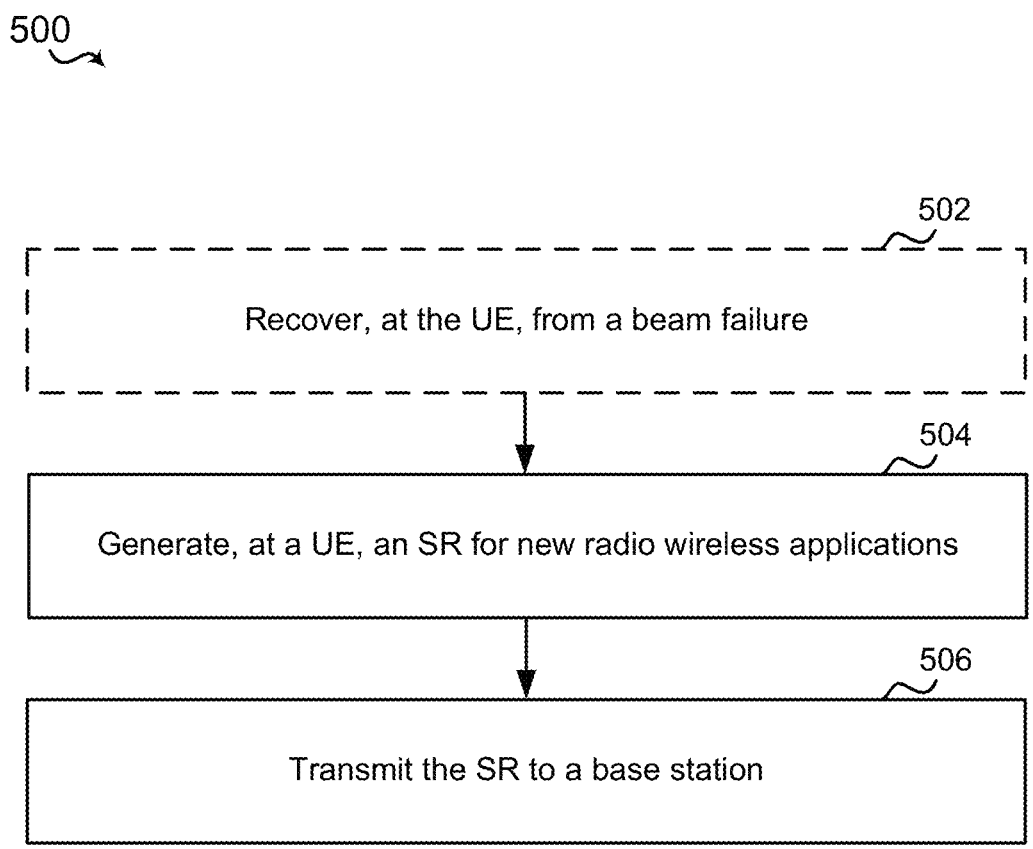
FIG. 5 is a flow diagram of an example of a method for SR generation and transmission in new radio applications.

Referring to FIG. 5, for example, a method 500 of wireless communication in operating UE 110 according to the above-described aspects to provide enhanced functionality for SR in new radio applications includes one or more of the herein-defined actions.

For example, at 502, method 500 may recover, at the UE, from a beam failure. For example, in an aspect, UE 110 may execute processor 212, modem 140, and/or SR component 155 to recover from a beam failure.

At 504, method 500 includes generating, at a UE (e.g., UE 110), an SR for new radio wireless applications. For instance, in an aspect, UE 110 may execute processor 212, modem 140, and/or SR component 155 to generate the SR, as described herein.

In some aspects, generating the SR may include generating the SR to have information about a total buffer size for all logical channels. In some aspects, generating the SR may include generating the SR to have information about a buffer size for a logical channel with highest priority and a non-empty buffer.

In some aspects, generating the SR may be in response to the recovery from the beam failure, a direction of the transmission of the SR indicating to the base station information about a new beam selection. Further, in some aspects, the SR may include information reporting a status of a buffer to the base station.

In some aspects, one or more of a structure, content, or triggering conditions of the SR may be based on at least one of a configured numerology or configured TTI required by a respective application.

In some aspects, a range of configurable periods of the SR is aligned with at least one of a configured numerology or configured TTI and latency requirement of a respective application.

At 506, method 500 includes transmitting the SR to a base station (e.g., base station 105, gNB). For instance, in an aspect, UE 110 may execute processor 212, modem 140, SR component 155, transceiver 202, and/or RF front end 288 to transmit the SR, as described herein.

In some aspects, transmitting the SR may include configuring a physical uplink control channel for the SR with the field. In some aspects, transmitting the SR may include configuring a physical uplink control channel for transmitting the SR with the field Although the operations or methods described above are presented in a particular order and/or as being performed by an example component, it should be understood that the ordering of the actions and the components performing the actions may be varied, depending on the implementation. In addition, aspects of any one of the methods described above can be combined with aspects of any other of the methods. For example, aspects of method 400 in FIG. 4 can be combined with aspects of method 500 in FIG. 5.

The various techniques described above with respect to enhancements or extensions to BSR and SR for new radio applications can involve one or more of the features described below.

For enhanced or extended BSR applications, currently in LTE the BSR is used to report the buffer status in the UE (e.g., UE 110) and is reported per logical channel group (LCG), which is the group of multiple logical channels (LCs or LCHs). In new radio, however, since different LCs might be configured with different QoS and mapped to different numerologies/TTIs, using BSR in a per LCG basis may result in a loss of granularity of the buffer status for different service types.

To address this situation, one or more of the following features can be implemented in new radio: BSR can indicate buffer size of each logical channel, that is, BSR is per LC and/or a set/subset of logical channels; a short BSR can be sent when one LC has non-empty buffer and includes one LC buffer size; and/or a truncated BSR can be sent to report the total buffer size of LC with a highest priority and/or a next highest priority and non-empty buffer.

In LTE there are currently several ways and triggers to send the BSR. However, once the Regular BSR is sent and new data comes, the UE may not be able to immediately report the newly arrived data until the Periodic BSR is triggered, which leads to buffer status update delays.

To address this situation, one or more of the following features can be implemented in new radio: when the received uplink grant is larger than a configured threshold, the UE can report BSR anyway (e.g., does not need to way for the next scheduled period). The size the BSR format structure can be fixed and can contain a fixed and reasonable number of LCs, or may be variable and may contain a variable number of LCs; and/or when the unserved portion of the last reported data in that LC drops below a configured threshold, the UE can report BSR to indicate the newly arrived data size.

For enhanced or extended SR applications, currently in LTE the SR is binary signaling on PUCCH to indicate to an eNB (e.g., base station 105) that the UE needs uplink grant for transmission of the buffered data. However, the SR does not indicate to the eNB how much data there is in the UE buffer exactly, which makes it hard for the eNB to schedule the grant size. To address this situation, one or more of the following features can be implemented in new radio: a new enhanced SR and the new PUCCH supporting the enhanced SR can be used, which include at least the total buffer size of the LC with highest priority and non-empty buffer or the total buffer size of all LCs In a mmW system, after a UE (e.g., UE 110) recovers from a beam failure, the UE needs to inform the gNB (e.g., base station 105) of its new beam selection. UEs may use the enhanced SR for this purpose, instead of creating a new signaling message. To address this situation, one or more of the following features can be implemented in new radio: in a mmW system, after a UE recovers from a beam failure, the UE is to send an enhanced SR to the gNB to inform its new beam selection. The direction the enhanced SR is received on by the gNB can also give the gNB information about the beam selection. The enhanced SR can also give gNB updated information about the buffer status as mentioned above For enhanced or extended SR and BSR on multiple numerologies/TTIs, in NR an LC might map to different numerologies/TTIs. To address this situation, one or more of the following features can be implemented in new radio: different numerologies/TTIs may have their own SR and BSR structure, content and triggering conditions, which are configured and required by their respective application requirements; the range of the configurable periods of BSR and SR can be aligned with its configured numerology/TTI and latency requirement of associated applications; and/or if a UE supports multiple numerologies/TTIs, a padding BSR can be sent over any one or more than one of the numerologies/TTIs that the UE is configured to use.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications at a user equipment (UE), comprising:
   receiving new data;
   receiving, from a base station, an uplink (UL) grant smaller than a first configured threshold;
   generating a buffer status report (BSR) for new radio wireless applications; and
   transmitting the BSR to the base station, wherein generating the BSR and transmitting the BSR occur in response to receiving the new data and the UL grant and having an unserved portion of a last reported data in a corresponding logical channel drop below a second configured threshold, the BSR including information reporting a size of the new data.

2. The method of claim 1, wherein the BSR indicates at least one of a buffer size for each logical channel or a total size for a set of logical channels.

3. The method of claim 1, wherein the BSR is a short BSR that includes information reporting a buffer size for one logical channel with non-empty buffer.

4. The method of claim 3, wherein transmitting the BSR includes transmitting the short BSR in an uplink (UL) medium access control (MAC) packet data unit (PDU) if the UL MAC PDU has a spare space.

5. The method of claim 1, wherein the BSR is a truncated BSR that includes information reporting a buffer size for at least one of a logical channel with highest priority or a subsequent highest priority and a non-empty buffer.

6. The method of claim 5, wherein transmitting the BSR includes transmitting the truncated BSR in an UL MAC PDU if the UL MAC PDU has a spare space.

7. The method of claim 1, wherein the BSR is a truncated BSR that includes information reporting a buffer size for at least one of a set of logical channels or a subset of the set of logical channels with non-empty buffers.

8. The method of claim 1, further comprising:
   receiving second new data; and
   receiving, from the base station, a second UL grant larger than a third configured threshold,
   wherein generating the BSR and transmitting the BSR further include generating a second BSR and transmitting the second BSR in response to receiving the second new data and the second UL grant, the second BSR including information reporting a size of the second new data.

9. The method of claim 8, wherein the second BSR has a format structure containing information for a number of logical channels.

10. The method of claim 1, wherein one or more of a structure, content, or triggering conditions of the BSR are based on at least one of a configured numerology or configured transmit time interval (TTI) required by a respective application.

11. The method of claim 1, wherein a range of configurable periods of the BSR is aligned with at least one of a configured numerology or configured TTI and latency requirement of a respective application.

12. A method for wireless communications at a user equipment (UE), wherein the UE supports multiple configured numerologies, multiple configured TTIs, or both, the method comprising:
   determining that spare resources are available in one or more of the multiple configured numerologies, multiple configured TTIs, or both, wherein the spare resources are uplink resources sufficient to include a padding BSR;
   selecting one of the one or more multiple configured numerologies, multiple configured TTIs or both for transmitting a padding BSR to a base station;
   generating a BSR; and
   transmitting the BSR to the base station, wherein the transmitting of the BSR includes transmitting a padding BSR over the selected one of the one or more of the multiple configured numerologies or the multiple configured TTIs, or both.

13. An apparatus at a user equipment (UE) for wireless communications, comprising:
   a memory storing instructions; and
   a processor coupled to the memory and configured to execute the instructions to:
      receive new data;
      receive, from a base station, a UL grant smaller than a first configured threshold;
      generate a buffer status report (BSR) for new radio wireless applications; and
      transmit the BSR to a base station, wherein to generate the BSR and transmit the BSR occur in response to receiving the new data and the UL grant and having an unserved portion of a last reported data in a corresponding logical channel drop below a second configured threshold, the BSR including information reporting a size of the new data.

14. The apparatus of claim 13, wherein the BSR indicates at least one of a buffer size for each logical channel or a total size for a set of logical channels.

15. The apparatus of claim 13, wherein the BSR is a short BSR that includes information reporting a buffer size for one logical channel with non-empty buffer.

16. The apparatus of claim 15, wherein to transmit the BSR, the processor is further configured to execute instructions to transmit the short BSR in an uplink (UL) medium access control (MAC) packet data unit (PDU) if the UL MAC PDU has a spare space.

17. The apparatus of claim 13, wherein the BSR is a truncated BSR that includes information reporting a buffer size for at least one of a logical channel with highest priority or a subsequent highest priority and a non-empty buffer.

18. The apparatus of claim 17, wherein to transmit the BSR, the processor is further configured to execute instructions to transmit the truncated BSR in an UL MAC PDU if the UL MAC PDU has a spare space.

19. The apparatus of claim 13, wherein the BSR is a truncated BSR that includes information reporting a buffer size for at least one of a set of logical channels or a subset of the set of logical channels with non-empty buffers.

20. The apparatus of claim 13, wherein the processor is further configured to execute instructions to:
   receive second new data; and
   receive, from the base station, a second UL grant larger than a third configured threshold,
   wherein generating the BSR and transmitting the BSR further include generating a second BSR and transmitting the second BSR in response to receiving the second new data and the second UL grant, the second BSR including information reporting a size of the new data.

21. The apparatus of claim 20, wherein the second BSR has a format structure containing information for a fixed number of logical channels.

22. The apparatus of claim 13, wherein one or more of a structure, content, or triggering conditions of the BSR are based on at least one of a configured numerology or configured transmit time interval (TTI) required by a respective application.

23. The apparatus of claim 13, wherein a range of configurable periods of the BSR is aligned with at least one of a configured numerology or configured TTI and latency requirement of a respective application.

24. A user equipment (UE) apparatus for wireless communications, wherein the UE is configured to support multiple configured numerologies, multiple configured TTIs, or both, the UE apparatus comprising:
    a memory storing instructions; and
    a processor coupled to the memory and configured to execute the instructions to:
    determine that spare resources are available in one or more of the multiple configured numerologies, multiple configured TTIs, or both, wherein the spare resources are uplink resources sufficient to include a padding BSR;
    select one of the one or more multiple configured numerologies, multiple configured TTIs or both for transmitting a padding BSR to a base station;
    generate a BSR; and
    transmit the BSR to the base station, wherein the transmitting of the BSR includes transmitting a padding BSR over the selected one of the one or more of the multiple configured numerologies or the multiple configured TTIs, or both.

25. An apparatus at a user equipment (UE) for wireless communications, comprising:
    means for receiving new data;
    means for receiving, from a base station, a UL grant smaller than a first configured threshold;
    means for generating a buffer status report (BSR) for new radio wireless applications; and
    means for transmitting the BSR to a base station, wherein generating the BSR and transmitting the BSR occur in response to receiving the new data and the UL grant and having an unserved portion of a last reported data in a corresponding logical channel drop below a second configured threshold, the BSR including information reporting a size of the received new data.

26. A non-transitory computer-readable medium storing computer-executable code at a user equipment (UE) for wireless communications, comprising:
    code for receiving new data;
    code for receiving, from a base station, a UL grant smaller than a first configured threshold;
    code for generating a buffer status report (BSR) for new radio wireless applications; and
    code for transmitting the BSR to a base station, wherein generating the BSR and transmitting the BSR occur in response to receiving the new data and the UL grant and having an unserved portion of a last reported data in a corresponding logical channel drop below a second configured threshold, the BSR including information reporting a size of the received new data.

* * * * *